United States Patent [19]

Seymour

[11] 4,353,378
[45] Oct. 12, 1982

[54] TOBACCO STALK GUIDE ASSIST

[75] Inventor: Shaun A. Seymour, New Holland, Pa.

[73] Assignee: Sperry Corporation, New Holland, Pa.

[21] Appl. No.: 187,876

[22] Filed: Sep. 17, 1980

[51] Int. Cl.$^3$ ............................................ A01D 45/16
[52] U.S. Cl. ................................ 130/31 R; 130/30 R
[58] Field of Search .......................... 130/30 R, 31 R; 56/27.5

[56] References Cited

U.S. PATENT DOCUMENTS

| | | | |
|---|---|---|---|
| 2,467,052 | 4/1949 | Roberts | 130/31 R |
| 3,212,506 | 10/1965 | Hagopian | 130/31 R |
| 3,252,463 | 5/1966 | Alpen | 130/30 R |
| 3,552,397 | 1/1971 | Greenough | 130/30 R |
| 4,151,847 | 5/1979 | Van Doukelaar | 130/30 R |
| 4,292,982 | 10/1981 | Butcher | 56/27.5 |
| 4,307,562 | 12/1981 | Seymour et al. | 56/27.5 |

Primary Examiner—Paul J. Hirsch
Attorney, Agent, or Firm—Darrell F. Marquette; Frank A. Seemar; Larry W. Miller

[57] ABSTRACT

A tobacco leaf stripping machine is provided having at least a pair of counter-rotating leaf stripping rolls forming a nip to gently grip tobacco leaves, a rotatable infeed tube into which is inserted a tobacco stalk positioned immediately above the nip, a knife attachable to the infeed tube and a stalk guide assist attachable to the machine adjacent and substantially surrounding a portion of the knife effective to guide the tobacco stalk with its leaves thereon into the knife and the infeed tube to insure any unstripped leaves are removed from the stalk.

5 Claims, 4 Drawing Figures

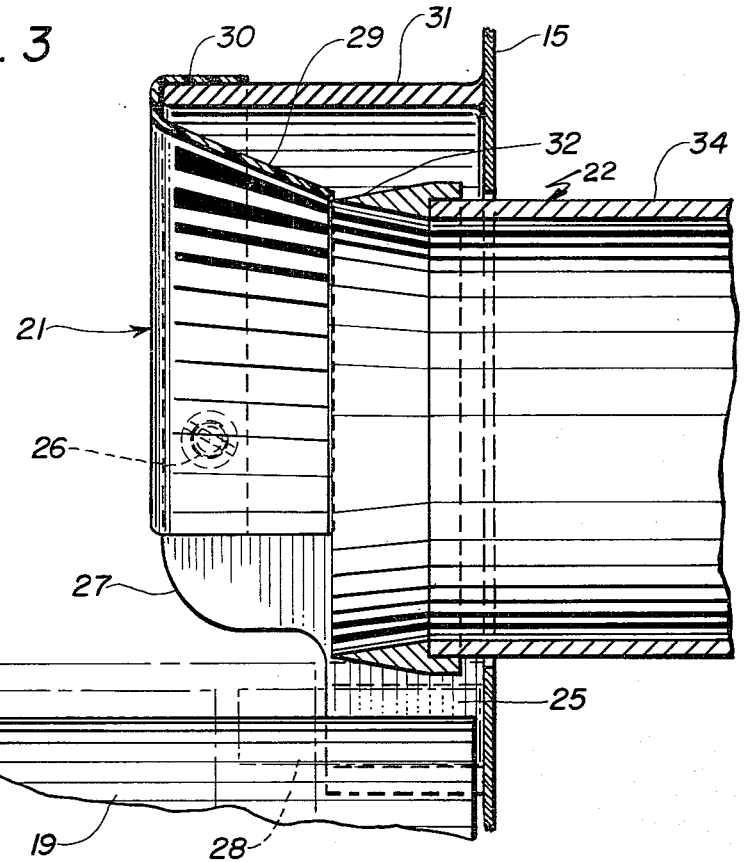
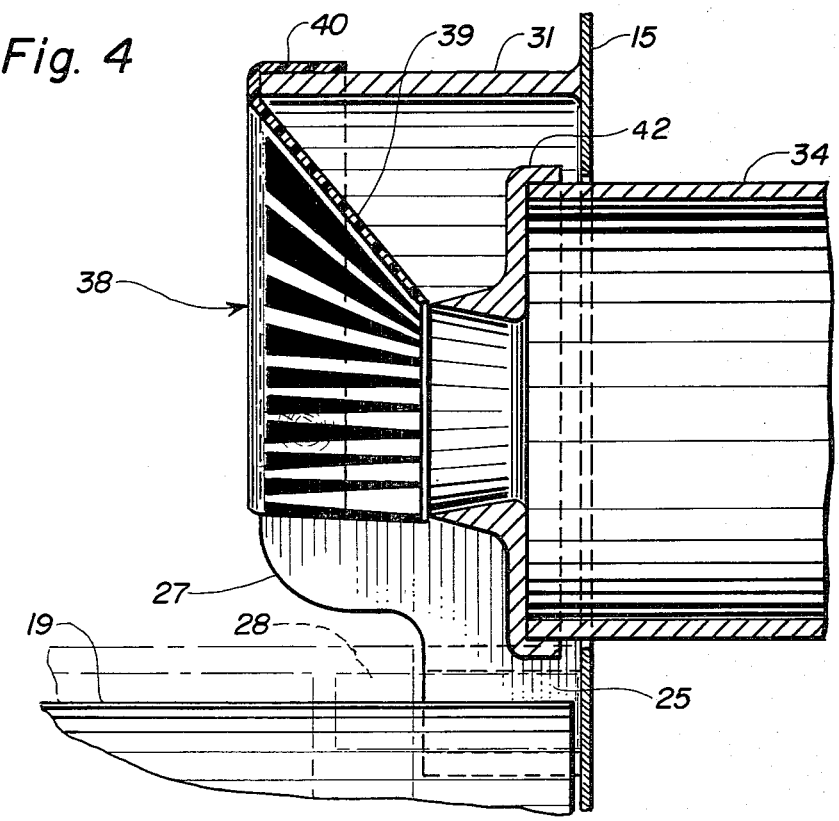

TOBACCO STALK GUIDE ASSIST

BACKGROUND OF THE INVENTION

This invention relates generally to tobacco stripping machines used to strip the cured leaves from the stalks of Burley tobacco. More specifically, the invention deals with a stalk guide assist which is used to direct the tobacco stalk into the infeed tube and the attached knife during the stripping operation.

The stripping of Burely tobacco has traditionally been a labor intensive operation that has been done by hand by farmers for several hundred yeras. Mechanization of this process has been hampered by the tender, easily damagable nature of the cured Burley tobacco leaves. Recently a Burely tobacco stripping machine has been developed which resolves this time consuming operation in a manner which does not damage the tender Burley tobacco leaf.

It has been discovered in working with this tobacco stripping machine that the design of the knife and the infeed tube area requires that a tobacco stalk be easily guided into that area. Typically, a farmer will feed the top end of the stalk of the tobacco plant into the infeed tube and experience difficulty in guiding the relatively thin stalk into the rotating infeed tube. Additionally, the stalk will catch on the knife edge of the infeed tube. Although experience may improve the accuracy of the operators aim, difficulty in efficiently feeding the tobacco stalks into the rotating infeed tube and its accompanying knife continues even with experience.

Additionally, because some tobacco stalks occasionally are not straight a problem has been experienced with feeding the crooked tobacco stalks into the infeed tube. Where the infeed tube and the knife are essentially the same diameter crooked stalks may be fed into the infeed tube, but much of the tobacco leaves which are not stripped from the stalk by the action of the stripping rollers engage the cutting edge of the knife some distance from the stalk. This results in the knife cutting the leaf at that point, thereby leaving much of the valuable tobacco leaf of the stalk.

The foregoing problems are solved in the design of the stalk guide assist and knife of the present invention by providing in a tobacco stripping machine having at least a pair of counter-rotating stripping rollers which form a nip therebetween, an improved stalk guide assist which directs the stalk into the infeed tube and the knife, as well as an improved knife attached to the infeed tube which cooperates with the stalk guide assist to effect the cutting of any non-stripped leaves close to the stalk.

SUMMARY OF THE INVENTION

It is a principal object of the present invention to provide in a tobacco leaf stripping machine a stalk guide assist which is semi-circular and generally funnel-shaped to guide tobacco stalks into the infeed tube where infeed rollers grip the stalk and continue pulling it inwardly into the machine during the stripping operation.

It is another object of the invention to provide in a tobacco stripping machine an improved stalk guide assist and knife which permits the non-stripped leaves from a crooked or curved stalk to be cut close to the stalk while permitting the crooked stalk to be fed into the infeed rollers within the machine which automatically continues to feed the stalk through the machine during the stripping operation.

It is a feature of the present invention that the stalk guide assist is funnel-shaped to guide or direct the crop material into the rotating knife and infeed tube.

It is another feature of the present invention that the stalk guide assist is cooperative with an improved knife to permit non-stripped leaves to be cut from the crooked stalk near the stalk and still permit crooked stalks to be fed into the rotating infeed tube.

It is another feature of the present invention that the stalk guide assist is open on the bottom to permit the knife to cut off any unstripped tobacco leaves.

It is an advantage of the present system that the stalk guide assist effectively guides the tobacco stalk past the rotating knife into the infeed tube without having the stalk become caught on the knife or otherwise obstruct it in its path towards the infeed tube.

It is another advantage of the present invention that the open-bottom design of the stalk guide assist permits the knife to cut any unstripped leaves and permits them to be passed through the stripping rollers onto the conveying belt below for sorting.

It is another advantage of the present invention that leaf loss on crooked tobacco stalks is minimized.

It is a further advantage of the present invention that the stalk guide assist may be color highlighted to accentuate the area into which the tobacco stalk is to be fed.

These and other objects, features and advantages are obtained by providing in a tobacco leaf stripping machine at least a pair of counter-rotating leaf stripping rolls forming a nip to gently grip tobacco leaves, a rotatable infeed tube into which is inserted a tobacco stalk positioned immediately above the nip, a knife attachable to the infeed tube and a stalk guide assist attachable to the machine adjacent and substantially surrounding a portion of the knife effective to guide the tobacco stalk with its leaves thereon into the knife and the infeed tube to insure any unstripped leaves are removed from the stalk.

BRIEF DESCRIPTION OF THE DRAWINGS

The features and advantages of this invention will become apparent upon consideration of the following detailed disclosure of the invention, especially when it is taken in conjunction with the accompanying drawings wherein:

FIG. 3 is an enlarged sectional view taken along the lines 3—3 of FIG. 2 showing in side elevation the positioning of the stalk guide assist, the knife and the infeed tube; and FIG. 4 is an enlarged sectional view taken along the lines 3—3 of FIG. 2 of an alternative embodiment of the knife which is mounted to the infeed tube and the corresponding stalk guide assist utilized with this alternative design.

DETAILED DESCRIPTION OF THE PREFERRED EMBODIMENT

Figure 1:
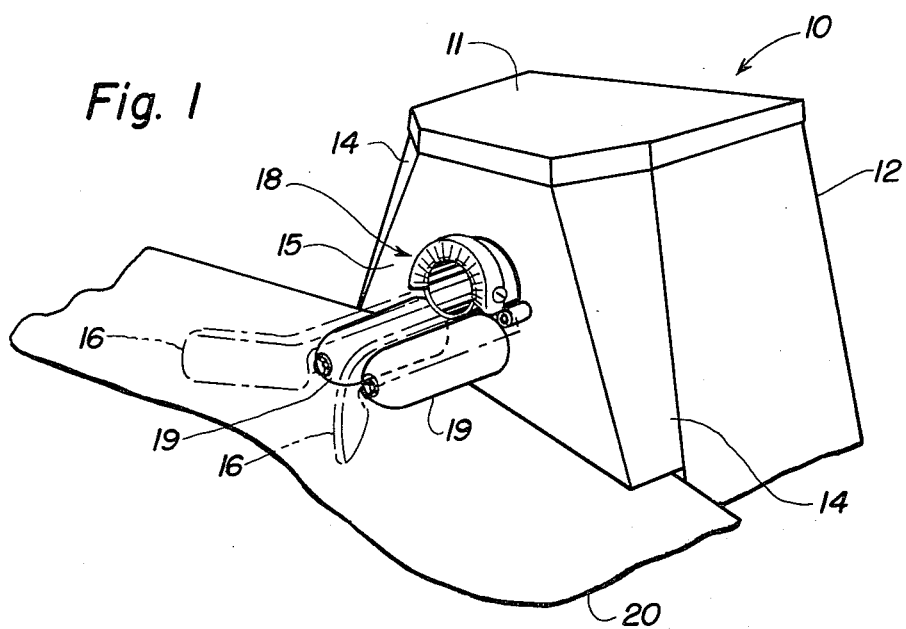
FIG. 1 is a partial illustration of the tobacco leaf stripping machine showing the relative positioning of the tobacco leaf stripping rolls with respect to the stalk infeed tube.

A tobacco leaf stripping machine 10 is seen generally in FIG. 1 in outline form. The tobacco stripper 10 has a housing which surrounds the working components that includes a top 11, a housing side 12, angled side 14 and a front side 15. Leaf and stalk guides 16, shown in phantom, assist the operator in directing the stalk of tobacco with its leaves into the counter-rotating stripping rolls 19. A stalk infeed, indicated generally by the numeral 18, receives the stalk rearwardly of the stripping rolls 19. A conveyor 20 underlies the stripping rolls 19 and carries the stripped tobacco leaves to a sorting location.

The tobacco stripper 10 thus far has been described only generally. A more detailed description and disclosure of the working components of the tobacco stripping machine 10 are found in copending U.S. Application Ser. No. 956,667 filed by Lawrence W. Butcher, specifically incorporated by reference in pertinent part hereinafter.

Figure 2:
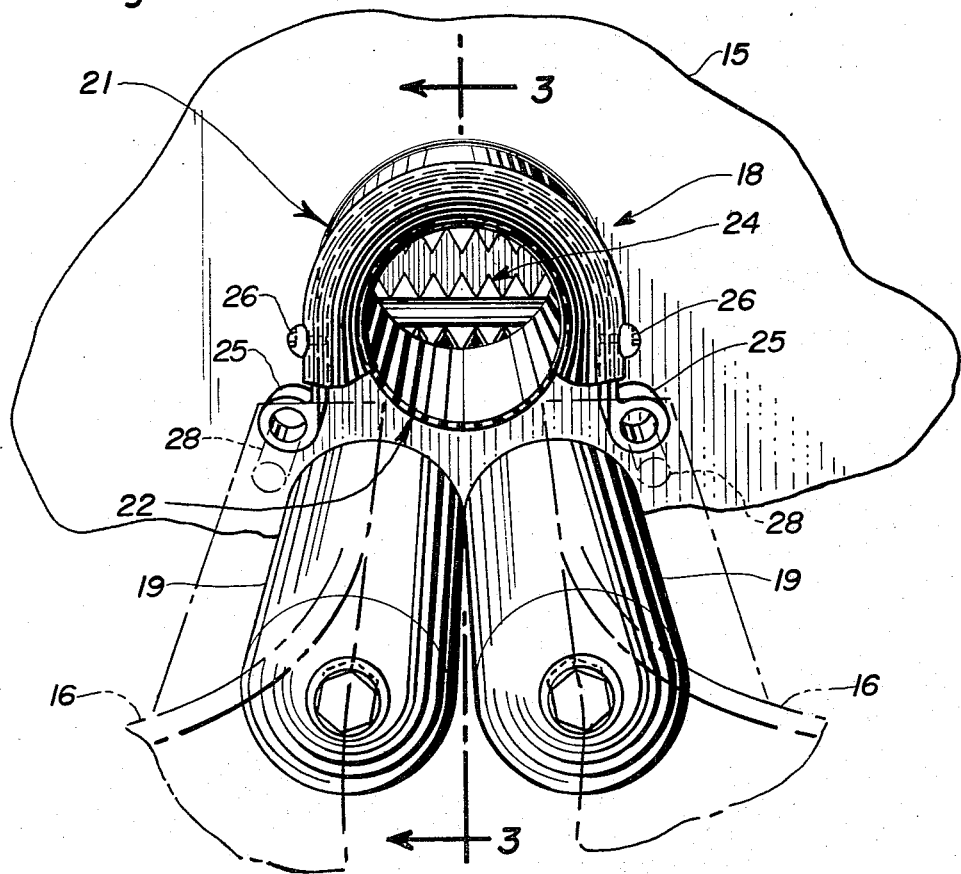
FIG. 2 is an enlarged prospective view of the front of the tobacco leaf stripping machine showing the leaf stripping roll and the overlying rotating infeed stalk and knife with the infeed rollers positioned rearwardly within the machine.

Specifically looking at FIG. 2, a portion of the front of the tobacco stripping machine 10 is seen with the stalk infeed, indicated generally by the numeral 18, being attached to the portion of the front 15 of the machine shown. Underlying the stalk infeed 18 are the pair of counter-rotating stripping rolls 19 and the leaf and stalk guides 16, partially illustrated in phantom or dotted lines. The stalk infeed 18 consists of a rotatable stalk infeed tube 22 and a stalk guide, indicated generally by the numeral 21. Stalk infeed rollers 24 consist of a pair of counter-rotating serrated-toothed shafts which are seen on the inside of the stalk infeed tube 22 and which serve to grip the tobacco stalk and pull it rearwardly through the machine during the leaf stripping operation.

The stalk guide 21 is retained in position by a stalk infeed support bracket, the bottommost portions being seen as 25 in FIG. 2. Retaining screws 26 fit through an appropriately sized aperature on the opposing sides of the stalk guide 21 and fasten into the semi-circular portion of the stalk infeed support bracket, seen partially as numeral 27 in FIG. 3 and 4. The bottom portion of the stalk infeed support bracket 25 consists of a pair of hollow cylinders through which the mounting pins 28 of the leaf and stalk guides 16 pass to retain the leaf and stalk guides 16 in position during operation.

As best seen in FIG. 3, the stalk guide 21 comprises a conical portion 29 and an upper portion 30 which wraps about the metal brace 31 which is appropriately fastened to the front side of the stripping machine 15. Alternately, the brace 31 could be a portion of a castig which projects through the metal sheeting which comprises the front 15 of the machine 10. The conical portion 29 of the stalk guide terminates adjacent the forward cutting edge of the rotary stalk knife 32. Rotary stalk knife 32 is appropriately fastened to the rotatable infeed tube 34, such as with set screws (not shown) the rotary stalk knife 32 and the rotatable infeed tube 34 in combination comprise the previously mentioned rotary stalk infeed which is indicated generally by the numeral 22. As the conical portion 29 of the stalk guide moves forwardly and upwardly away from the stalk knife 32 it bends upward to form the upper portion 30 of the conical portion. Upper portion 30 overlaps the brace 31 and continues in downward fashion to cover the semi-circular stalk infeed support bracket 27. It is through an apperture in this upper portion 30 which the retaiing screws 26 pass into the stalk infeed support bracket 27 to retain the stalk guide 21 in position during operation. It should be noted that metal brace 31 is the top portion of the stalk infeed support bracket 27. Thereafter support bracket 27 continues in semi-circular pattern extending downwardly around both sides of the rotary stalk infeed to form the rigid portion into which the retaining screws 26 are fastened, as previously described.

FIG. 4 shows the alternative embodiment of the stalk guide, indicated generally as 38, and the rotary knife 42. As seen in FIG. 4 the only structure which is changed from FIG. 3 is the stalk guide 38 and the rotary knife 42. The stalk guide 38 consists of a conical portion 39 which moves upwardly and outwardly from the cutting or leading edge of the knife 42 towards the upper portion 40. The upper portion 40 wraps about the metal brace 31 and continues around the brace in a semi-circular fashion described hereinbefore. The angle of the stalk guide 38 through its conical portion 39 is increased over the preferred embodiment because of the narrower diameter of the cutting edge of the knife 42. Knife 42 is also attached to the rotary infeed tube 34 by appropriate means, such as with set screws (not shown). The smaller diameter formed by the cutting or leading edge of the knife 42 permits crooked stalks to be fed into the rotary infeed tube 34 by the stalk guide and still have the leaves that are not stripped by the counter-rotating stripping rolls 19 be cut close to the stalk by the smaller diameter cutting edge of the knife 42. By retaining the larger diameter of the infeed tube 34 the stalks may continue to be processed through the machine into the stalk infeed gripping rollers 24 of FIG. 2. Thus, with the improved design of the knife 42 utilizing a smaller diameter cutting edge or surface the leaves which may be unstripped by the stripping rolls 19 are cut much closer to the stalk, thereby minimizing the amount of valuable tobacco leaf lost during the stripping operation.

In operation, the operator feeds a stalk of cured tobacco top end first into the stalk guide 21. Because of its funnel-shape with its downwardly sloping sides towards the rotary stalk infeed 22, the stalk guide 21 directs the stalk of tobacco into the rotating infeed tube 34 and the knife 34 or 42 attached thereto. The leaves, which are hanging generally downwardly from the stalk, are gripped by the counter-rotating stripping rollers 19 and gently pulled from the stalk. Any unstripped leaves which reach the knife attached to the edge of the rotating infeed tube 34 are cut from the stalk before the stalk is passed into the stripping machine. The counter-rotating infeed rollers 24 grip the stalk and automatically move it rearwardly toward apparatus which processes the stalk as described in the aforementioned incorporated by reference patent application.

Should a large number of crooked stalks by required to be processed by the machine, the alternate embodiment utilizing a smaller diameter knife, seen in FIG. 4 as item 42, is utilized with the adapted stalk guide 38 to direct the crooked stalk into the rotating infeed tube 34 via the smaller diameter knife 42. Any unstripped tobacco leaves are cut from the stalk closer to the stalk, thereby minimizing valuable leaf loss. Thus, there is provided an inexpensive and practical apparatus for guiding tobacco stalks quickly and easily into the rotating infeed tube for processing by the tobacco stripping machine during operation.

It should be noted that the stalk guide 21, or its alternative embodiment 38, can be painted a color which differs from the color of the front 15 of the machine to accentuate the area where the stalk should be placed for processing.

While the preferred structure in which the principles of the present invention have been incorporated is shown and described above, it is to be understood that the invention is not to be limited to the particular details thus presented, but in fact, widely different means may be employed in the practice of the broader aspects of this invention. The scope of the appended claims is intended to encompass all obvious changes in the details, materials and arrangements of parts which will occur to one of skill in the art upon a reading of this disclosure.

Having thus described the invention what is claimed is:

1. In a tobacco leaf stripping machine having at least a pair of counter-rotating leaf stripping rolls forming a nip to gently grip the tobacco leaves, a rotatable infeed tube with an infeed end positioned immediately above the nip into which is inserted the tobacco stalk and knife means attachable to the infeed end of the infeed tube, the improvement comprising:

a stalk guide assist attachable to the machine adjacent and substantially surrounding a portion of the knife means effective to guide the tobacco stalk with its leaves thereon into the knife means and the infeed tube to insure the leaves are stripped from the stalk; and the stalk guide assist being generally semi-circular in shape having an open end located above the stripping rolls thereby leaving the knife means exposed immediately above the nip for cutting leaves from the stalk.

2. The apparatus according to claim 1 wherein the stalk guide assist further is generally funnel-shaped having a first end adjacent the machine and an opposing second end, the first end having a first radius and the second end having a second radius, the second radius being greater than the first radius.

3. The apparatus according to claim 2 wherein the knife means is hollow and generally cylindrical in shape with a cutting surface and a non-cutting surface, the cutting surface further having a diameter greater than the diameter of the infeed tube.

4. The apparatus according to claim 3 wherein the knife means is generally hollow with a cutting surface and a non-cutting surface, the cutting surface having a diameter less than the diameter of the infeed tube and the non-cutting surface having a diameter greater than the diameter of the cutting surface.

5. The apparatus according to claims 3 or 4 wherein the knife means has a stalk receiving end and a stalk transferring end and is flared outwardly from an axis taken through the center of the infeed tube so that the knife means is further from the axis at the stalk receiving end than at the stalk transfer end.

* * * * *